Figure 1:
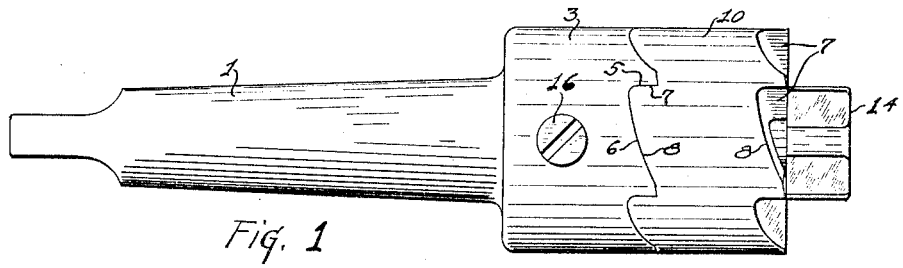

W. W. JOHNSON.
COUNTERBORING TOOL.
APPLICATION FILED FEB. 9, 1920.

1,408,947.

Patented Mar. 7, 1922.
2 SHEETS—SHEET 1.

Inventor
William W. Johnson

By Bates & Macklin
Attorneys

W. W. JOHNSON.
COUNTERBORING TOOL.
APPLICATION FILED FEB. 9, 1920.

1,408,947.

Patented Mar. 7, 1922.
2 SHEETS—SHEET 2.

Inventor
William W. Johnson
By Bates & Macklin
Attorneys

UNITED STATES PATENT OFFICE.

WILLIAM W. JOHNSON, OF CLEVELAND, OHIO.

COUNTERBORING TOOL.

1,408,947.  Specification of Letters Patent.  Patented Mar. 7, 1922.

Application filed February 9, 1920. Serial No. 357,128.

*To all whom it may concern:*

Be it known that I, WILLIAM W. JOHNSON, a citizen of the United States, residing at Cleveland, in the county of Cuyahoga and State of Ohio, have invented a certain new and useful Improvement in Counterboring Tools, of which the following is a full, clear, and exact description, reference being had to the accompanying drawings.

This invention relates to metal working, particularly tools for boring purposes. The essential object is economy in the use of expensive tool steel, effectiveness in operation and cheapness of manufacture.

My invention contemplates a provision of a shank or tool holder of less expensive material than that required for cutting edges, while the tool itself is a short end section fitted to said holder and securely positioned and driven thereby.

A more specific object is to make said end section replaceable. Still another object is to make such cutting sections reversible whereby cutting edges may be formed on either end while the holder or shank member is provided with surfaces adapted to fit the relief and cutting edges closely, whereby driving and thrust are taken on surfaces complementary to those of the cutter section.

My invention is illustrated in the drawings as embodied in a boring tool commonly known as a counterbore. The above and other objects will become more apparent in the following description which relates to the drawings; and the essential characteristics are hereinafter summarized in the claims.

Figure 2:
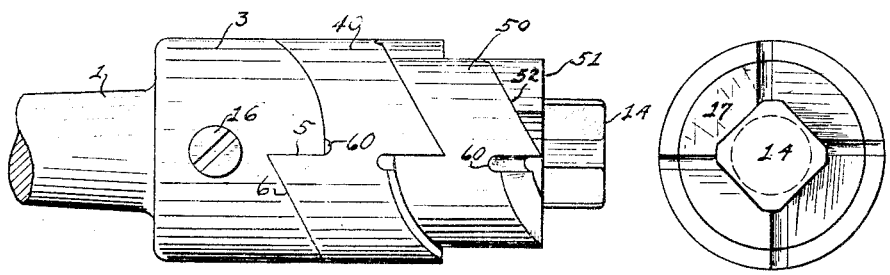
Figure 3:
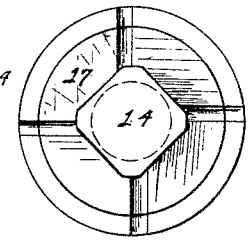
Figure 4:
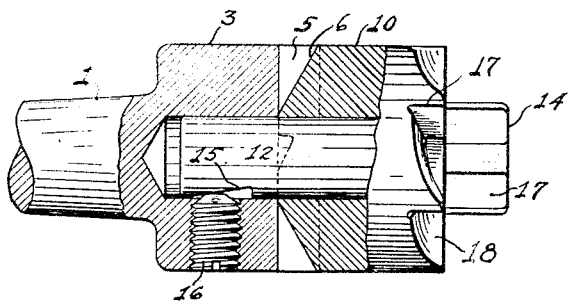
Figure 5:
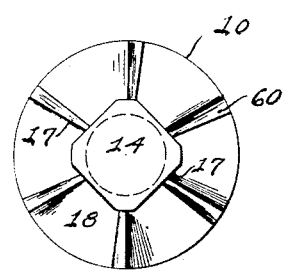
Figure 6:
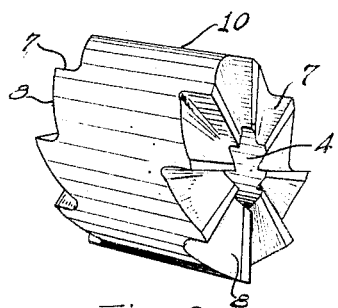
Figure 7:
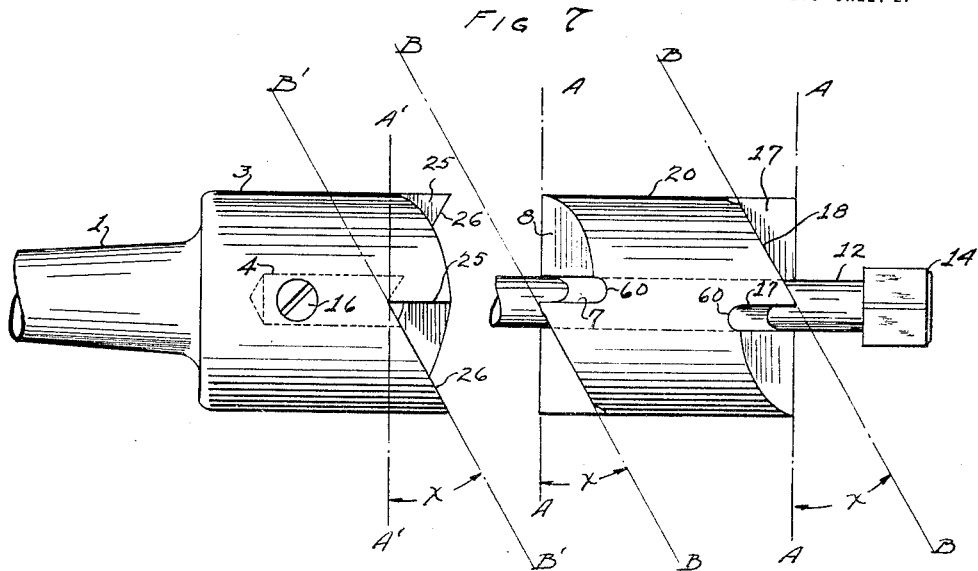
Figure 8:
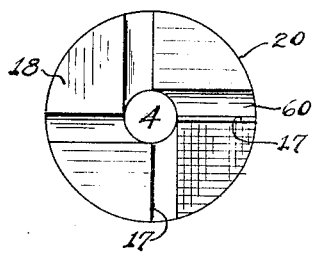
Figure 9:
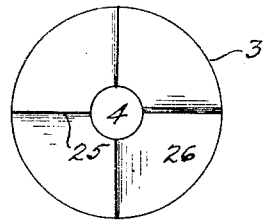
Figure 10:
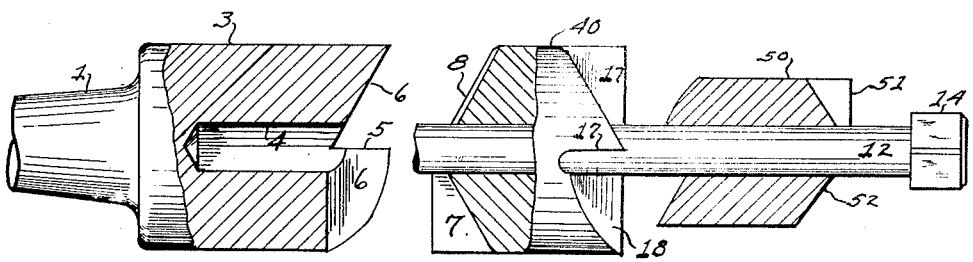

In the drawings, Fig. 1 is a side elevation of the boring tool having six cutting edges constructed in accordance with my invention; Fig. 2 is a similar side elevation of a modified form showing a double removable cutter section having four cutting edges; Fig. 3 is an end elevation of the same; Fig. 4 is in the nature of an axial section through the tool shown in Fig. 1; Fig. 5 is an end elevation of the same; Fig. 6 illustrates in perspective the form of cutter section having eight cutting edges adapted for use with such tools; Fig. 7 is a telescopic view in the nature of a side elevation of the parts comprising the tool similar to that shown in Fig. 1 but having a lesser number of cutting teeth; Fig. 8 is an end view of the cutter section; Fig. 9 is an end view of the shank showing the surfaces which are complementary and fit either end of the cutter; Fig. 10 is a telescopic view partly in section of the parts of the two cutter counterbores shown in Fig. 2.

Describing the parts by the use of reference characters and referring particularly to Figs. 1 and 4, numeral 1 designates a standard tapered shank integral with an enlarged head 3, the forward face of which is cut somewhat similarly to a cutter end but is accurately formed so that radial surfaces 5 and 6 shall exactly fit the cutting edge surfaces 7 and 8 respectively of the cutter section proper 10. The cutter section is provided with a central bore adapted to closely fit the cylindrical shank 12 of the pilot 14 overhanging the cutting edges of the cutter, and having at its inner end a tapered surface 15 against which a suitable set screw 16 through the threaded end of the head 3 may abut to securely hold the cutter element in position. The pilot 14, formed, first as a cylindrical head has parts cut away for purposes of lubrication which may be accomplished by a longitudinal groove or by flat surfaces 17.

It will be seen that this construction lends itself to making the cutter section 10 of the best of tool steel while the head 3 and shank 1 may be made of softer steel much cheaper to obtain, and easier to machine. It will also be seen that the cutter when in position is very rigidly held as experienced and as demonstrated, and may operate as effectively as integral counterbores of this character. It follows therefore, that considerable economy is effected, first in the saving of expensive tool steel material, second in the provision of two identical sets of cutting teeth, thus doubling the length of the life of the tool for purposes of illustrating the commercial practicability of manufacturing such tool.

I now refer to Figs. 7, 8 and 9, which for simplicity are shown as counterbores of four cutting teeth. In this case as before I provide the tapered shank 1 integral with the head 3 which has an axial bore 4 to receive the shank 12 of the guiding pilot 14 arranged as above described to be clamped by the set screw 16. The problem presented is to arrange or select angular positions of the surfaces of the cutting and relief faces of the cutter and the complementary surfaces of the shank so that they may be conveniently cut by standard milling cutters and at the same time to cause the surfaces on the shank head and cutter, to be exactly complementary in order that they may accurately fit. The cutter member designated 20 corresponding to the element 10, above described, may be cut accurately by causing a milling cutter during its cutting operation to travel on an angle with relation to the cutter, leaving the surface 18 lying in a plane indicated by a line B—B, having a predetermined angle with relation to the axis of the cutter. This cutter is preferably so formed as to leave the surface 17 in a radial plane, the amount of material removed being such as to leave the forward edge of the relief surface 18 in a plane A—A at right angles to the axis of the cutter and which plane includes the cutting edges.

In order that the surfaces of the head 3 may cut complementary, the plane A—A is considered as positioned inwardly a considerable distance from the end of the head, and a milling cutter is selected, having one surface at an angle to its axis of rotation, said angle being the complement of the angle between the planes A—A and B—B. The direction of movement of the cutter in its cutting operation is radially of the head 3, thus forming a surface 26 in a plane indicated by the line $B_1$—$B_1$ and the surface 25 while the line on which the surface 25 meets the surface 26 is a radial line in the plane $A_1$—$A_1$ corresponding to the plane A—A and to the radial cutting edges of the cutter.

As a specific example the angles indicated by "X" are all 30° and the line along which the planes A and B meet are all radial lines. This or similar selection of angles has been found to give the desired strength of cutting teeth for certain classes of work and lends itself to the convenient construction of the tool.

My invention may be adapted for reaming holes of two diameters, between which diameters is a radial shoulder, by the method illustrated in Figs. 2 and 10. Here I have provided the shank 1, head 3 and surfaces complementary to the cutter as before, a cutter 40 corresponds to the cutter 10 and embraces a lead shank secured by a screw 16 as before. At the cutting side of the cutter member 40 I provide another cutter 50 having cutting edges 51 and relieving surfaces 52 corresponding to the surfaces 7 and 8, and 17 and 18 above described while at its inner end the cutting member 50 is formed after the same manner, as the surfaces of the head 3, so that they may be precisely complementary to the surfaces 40. It will be seen that the two sets of cutter teeth cannot be put together nor can two sets of radial notches of the head be made to fit accurately. The cutter 50 therefore, has only one cutting edge but the tool has the advantages of being capable of boring holes of different diameters at the same time and, by reason of the ready removability of the cutters 40 and 50, the relative diameters thereof as well as the distance between the cutting edges 47 and 51, may be regulated by the use of cutters of this character of different sizes.

In several of the views, I have illustrated grooves 60 between the relief surfaces and the cutting faces of the cutter members which may or may not be used at the discretion of the designer, they serve to permit accurate fitting of the complementary surfaces.

I claim:

1. A boring tool comprising a driving carrier member, an axially aligned cutter member removably secured thereto having cutting teeth at either end, said driving member having surfaces complementary to said cutting teeth of the cutter.

2. In a tool of the character described, the combination of a driving head and a cutter member having cutting edges on its opposite faces, removable means for securing the said cutter to the head in axial alignment therewith, the cutting edges of the cutter lying in substantially radial planes, the relief faces of the cutter lying in planes at an angle to the axis of the cutter, while the cutting faces of the cutting teeth lie in planes substantially parallel with the axis, there being surfaces on the driving head for engagement with the cutter complementary to the cutting and relief surfaces of the cutter.

3. In a tool of the character described, the combination with a carrier head having an axially aligned cutter member removably secured thereto and having similar cutting and relief faces at each end forming cutting teeth, the cutting and relief faces of each tooth meeting on a line perpendicular to the axis of the cutter, the cutting and relief faces of adjacent teeth meeting on a line inclined to the axis of the cutter, complementary faces on the carrier head adapted to receive the faces of the cutter at one end of the cutter member whereby the thrust and torque of the cutter may be taken up by said complementary faces in close contact.

4. In a tool of the character described, the combination of a driving head and two cutters axially aligned therewith, and means for securing them in position, said driving head having surfaces complementary to the surfaces defining said teeth, one of said cutters having teeth on its opposite faces, the other of said cutters having teeth on one end, the other end having surfaces formed complementary to the abutting surfaces of the first mentioned cutter.

In testimony whereof, I hereunto affix my signature.

WILLIAM W. JOHNSON.